(12) United States Patent
Cougar

(10) Patent No.: US 10,349,770 B1
(45) Date of Patent: Jul. 16, 2019

(54) PACKAGE RECEPTACLE

(71) Applicant: Alex Cougar, Grosse Pointe, MI (US)

(72) Inventor: Alex Cougar, Grosse Pointe, MI (US)

( * ) Notice: Subject to any disclaimer, the term of this patent is extended or adjusted under 35 U.S.C. 154(b) by 0 days.

(21) Appl. No.: 16/261,431

(22) Filed: Jan. 29, 2019

Related U.S. Application Data

(60) Provisional application No. 62/652,168, filed on Apr. 3, 2018.

(51) Int. Cl.
*A47G 29/14* (2006.01)
*A47G 29/20* (2006.01)
*G07C 9/00* (2006.01)
*H04N 5/225* (2006.01)

(52) U.S. Cl.
CPC ............ *A47G 29/141* (2013.01); *A47G 29/20* (2013.01); *G07C 9/00182* (2013.01); *H04N 5/2253* (2013.01); *A47G 2029/145* (2013.01)

(58) Field of Classification Search
CPC .............. A47G 29/141; A47G 29/20; A47G 2029/145; G07C 9/00182; H04N 5/2253
See application file for complete search history.

(56) References Cited

U.S. PATENT DOCUMENTS

| 5,071,063 A | * | 12/1991 | Overstreet | ......... | A47G 29/1209 |
| | | | | | 232/17 |
| 2012/0004761 A1 | * | 1/2012 | Madruga | ................ | G06Q 30/02 |
| | | | | | 700/214 |
| 2015/0021386 A1 | * | 1/2015 | Farentinos | ............. | A47G 29/22 |
| | | | | | 232/43.3 |

* cited by examiner

*Primary Examiner* — Nam D Pham

(57) ABSTRACT

A package receptacle is configured to allow for the convenient input, temporary storage, and selective removal of packages and items. The package receptacle includes a receptacle, a tongue plate, a one-way access hinge mechanism, a slab, an access mechanism, and a lockable hatch. The receptacle is the container into which packages and items are placed for storage. The tongue plate is a protrusion that prevents theft or removal of items placed within the receptacle by covering the opening of the receptacle. The one-way access hinge mechanism prevents items from exiting the receptacle in the reverse manner in which items were inserted. The slab is a heavy weighted unit that prevents removal of the apparatus from its position. The access opening is cut into the receptacle to allow for retrieval of items. The lockable hatch is a closure that prevents unauthorized access to items contained within the receptacle.

19 Claims, 6 Drawing Sheets

PACKAGE RECEPTACLE

The current application claims a priority to the U.S. Provisional Patent application Ser. No. 62/652,168 filed on Apr. 3, 2018.

FIELD OF THE INVENTION

The present invention generally relates to a package receptacle. More specifically, the package receptacle relates to a container equipped for temporary, secure storage of delivered packages and items.

BACKGROUND OF THE INVENTION

The omnipresence of package delivery services is quickly increasing. As the efficiency and technology related to package delivery services improves, so too does the capability of large companies to handle large delivery requests. There is a large shift in companies moving from physical storefronts to online ones, as shopping online is generally far simpler and more efficient for the customer than traveling to a store and hoping that their desired product is available and in-stock. Consumer demand results in increased presence of boxes and other large items being packed and sent across the country and the world.

Unfortunately, such services are hindered by security issues. Packages currently cannot be left unsupervised in many areas for a long time. Many expensive packages require signatures or other forms of authentication before the deliverer can complete package delivery. Furthermore, upon delivery, many packages are vandalized or otherwise interfered with after delivery. In many neighborhoods, packages seen resting on an online shopper's doorstep are viewed as easy targets for theft. What is needed is a means of protecting packages from theft or tampering at their arrival location. Further desirable is a device which enables mailmen and package delivery services to easily add packages, and users to easily remove said packages at their convenience.

The present invention addresses these issues. The present invention secures by screws or bolts to a large concrete slab upon the ground. This prevents hostile groups from removing the present invention from its position entirely. An opening at the top allows package deliverers to quickly drop packages inside. A long, tall body ensures that packages are out of arms' reach from the top. Further, a one-way tongue extending in front of the opening prevents packages from exiting the present invention the same way they entered. In an exemplary embodiment, a door with a lock and a unique key held or known only by the owner of the present invention allows the user to access their stored packages. In this way, the intended package recipient, or an approved friend of the package recipient, are the only ones who can access the contents of the present invention. A connected mobile software application informs the user as to when a package arrives and is placed within the present invention. The mobile software application also informs the delivery persons of the specific location of the smart mailbox, alerts users if and when the smart box has been attempted to open and/or if an old password/passcode/code, etc. is opened, and/or can provide other updates by users and/or delivery persons as to location changes for a delivery, if necessary.

DETAILED DESCRIPTION OF THE INVENTION

All illustrations of the drawings are for the purpose of describing selected versions of the present invention and are not intended to limit the scope of the present invention.

Figure 4:
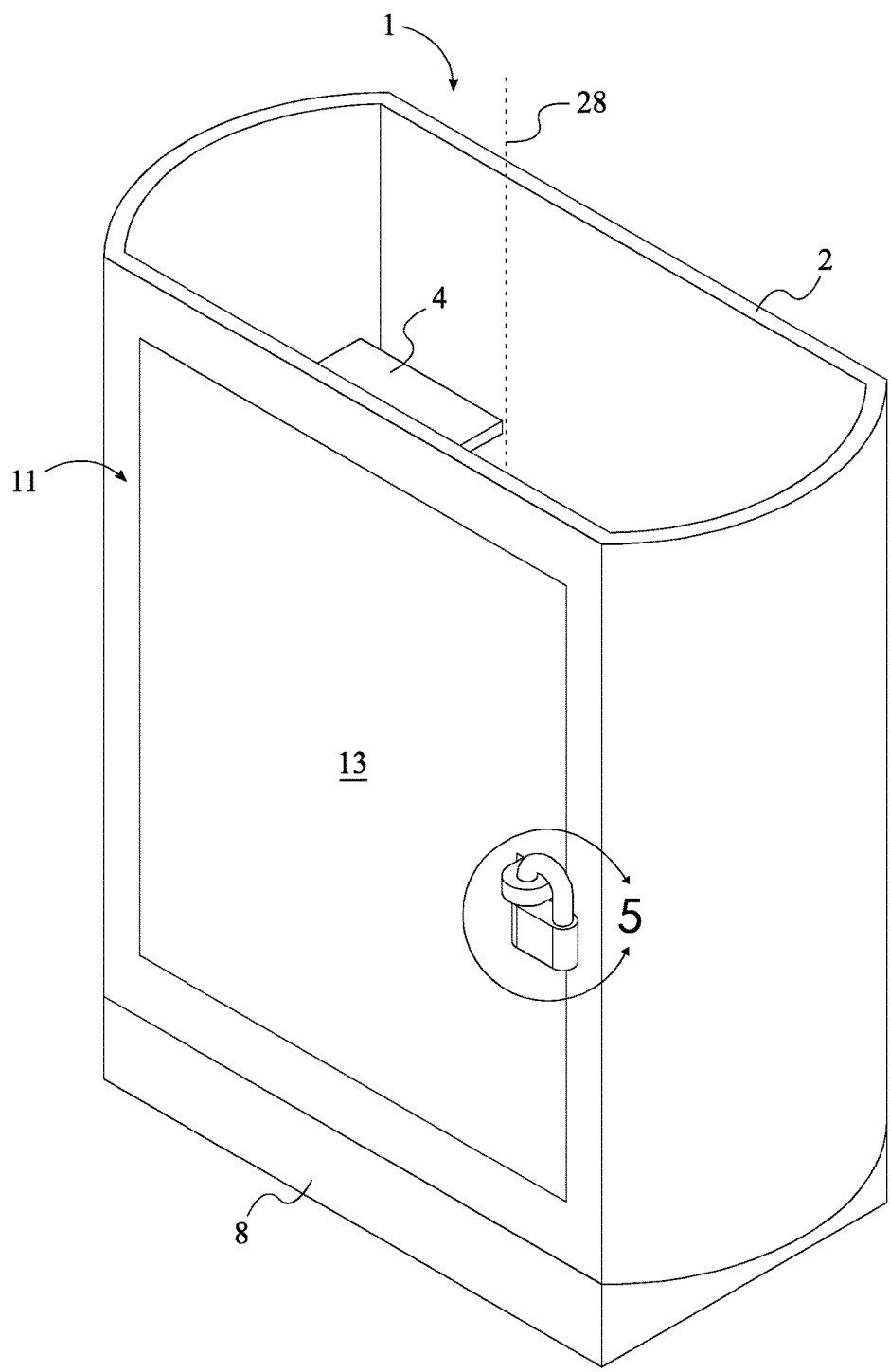
FIG. 4 is a front-right perspective view of the present invention.

The present invention is a package receptacle that is used to contain and protect packages and items placed within. The present invention is configured to allow for the convenient input of packages and items and selective removal of packages and items. The present invention comprises a receptacle 1, a tongue plate 4, a one-way access hinge mechanism 5, a slab 8, an access opening 11, and a lockable hatch 12, as seen in FIG. 4. The receptacle 1 is the container into which packages and items are placed for storage. The tongue plate 4 is a protrusion that prevents theft or removal of items placed within the receptacle 1 by covering the opening of the receptacle 1, thereby preventing removal of inserted items. The one-way access hinge mechanism 5 is a connection that prevents items from exiting the receptacle 1 in the reverse manner in which items were inserted. The slab 8 is a heavy weighted unit that prevents the present invention from being removed from its position once the present invention is situated in place. The access opening 11 is an opening cut into the receptacle 1 that allows for retrieval of items. The lockable hatch 12 is a closure that prevents unauthorized access to items contained through the access opening 11.

Figure 3:
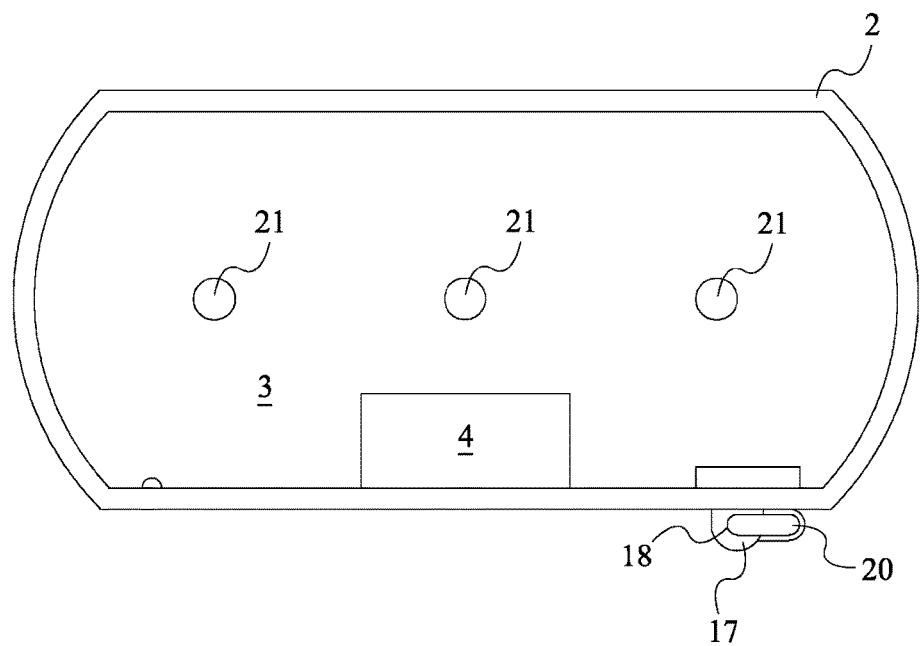
FIG. 3 is a top view of the present invention.

The general configuration of the aforementioned components allows the present invention to efficiently and effectively store items and packages within the receptacle 1. The receptacle 1 comprises a rim 2 and a base 3, as seen in FIG. 3. The rim 2 delineates an opening of the receptacle 1, through which items can be added to the receptacle 1. The base 3 is a closure which supports items inserted into the receptacle 1 and allows for arrangement of the receptacle 1 upon the slab 8. The tongue plate 4 is connected adjacent to the rim 2 by the one-way access hinge mechanism 5. In this way, the tongue plate 4 is biased away from the rim 2. The tongue plate 4 is oriented towards a central axis 28 of the receptacle 1, as seen in FIG. 4. This arrangement allows the tongue plate 4 to prevent unauthorized persons from removing packages and items through the opening of the receptacle 1. The slab 8 is externally connected to the receptacle 1, adjacent to the base 3. This arrangement ensures that the receptacle 1 is firmly positioned atop the slab 8, thus preventing hostile entities from tampering with or stealing the receptacle 1. The access opening 11 laterally traverses into the receptacle 1. In this way, the user can retrieve items contained within the receptacle 1. The access opening 11 is positioned in between the tongue plate 4 and the base 3. This arrangement ensures that the access opening 11 is appropriately positioned to allow the user to access items that have moved past the tongue plate 4. The lockable hatch 12 is hingedly connected to the receptacle 1, adjacent to the access opening 11. In this manner, the lockable hatch 12 covers the access opening 11, preventing unauthorized access to the contents of the receptacle 1.

Figure 2:
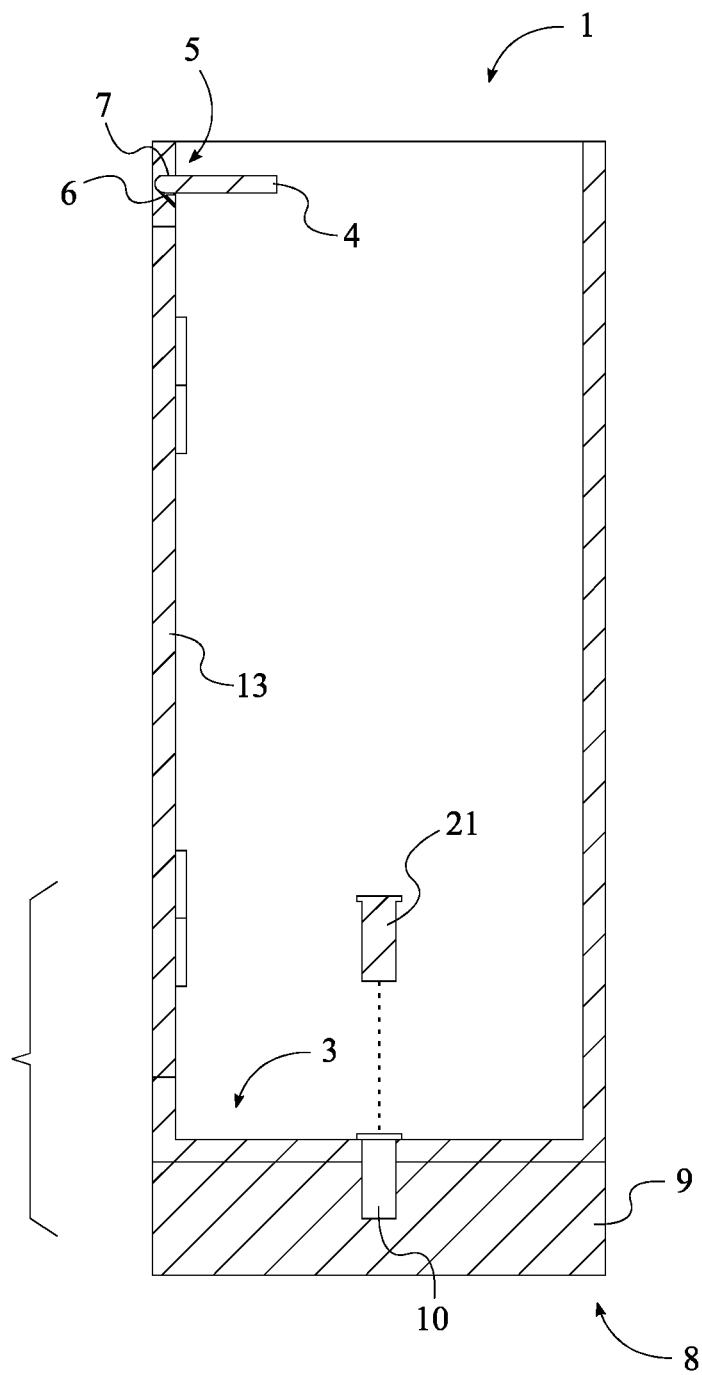
FIG. 2 is a cross-sectional view of the present invention taken along line 1-1 in FIG. 1.

The receptacle 1 requires firm connection to the slab 8 in order to prevent tampering or theft. The slab 8 comprises a slab body 9 and a plurality of mounting holes 10, as seen in FIG. 2. The slab body 9 is the volume of space occupied by the slab 8. The plurality of mounting holes 10 is a series of circular cuts into the slab 8 that allow for connection to the receptacle 1. In an exemplary embodiment, the plurality of mounting holes 10 is threaded in order to further enhance the ability of the receptacle 1 to connect to the slab body 9. The plurality of mounting holes 10 traverse into the slab body 9. This arrangement ensures that the plurality of mounting holes 10 provide an adequate mechanism for fastening the receptacle 1 to the slab 8. The plurality of mounting holes 10 is distributed across the slab body 9. This arrangement allows for secure attachment of the receptacle 1 to the plurality of mounting holes 10. The plurality of mounting holes 10 is positioned adjacent to the base 3. In this way, the receptacle 1 is appropriately positioned for use. Also, in the exemplary embodiment, the plurality of mounting holes 10 is positioned parallel to the central axis 28 of the receptacle 1. By positioning the plurality of mounting holes 10 in a linear pattern across the slab body 9, the present invention is better able to secure to the slab 8.

The present invention requires a set of fixtures that can allow the receptacle 1 to connect to the plurality of mounting holes 10. To this end, the present invention further comprises a plurality of fasteners 21. The plurality of fasteners 21 is a set of cylindrical extrusions that connect to the plurality of mounting holes 10, as seen in FIG. 2. The plurality of fasteners 21 is mounted through the base 3. In this way, the plurality of fasteners 21 connects the base 3 to the slab 8. Each of the plurality of fasteners 21 is threadably engaged to a corresponding hole from the plurality of mounting holes 10. This arrangement enables the plurality of fasteners 21 to secure into position relative to the plurality of mounting holes 10.

Figure 1:
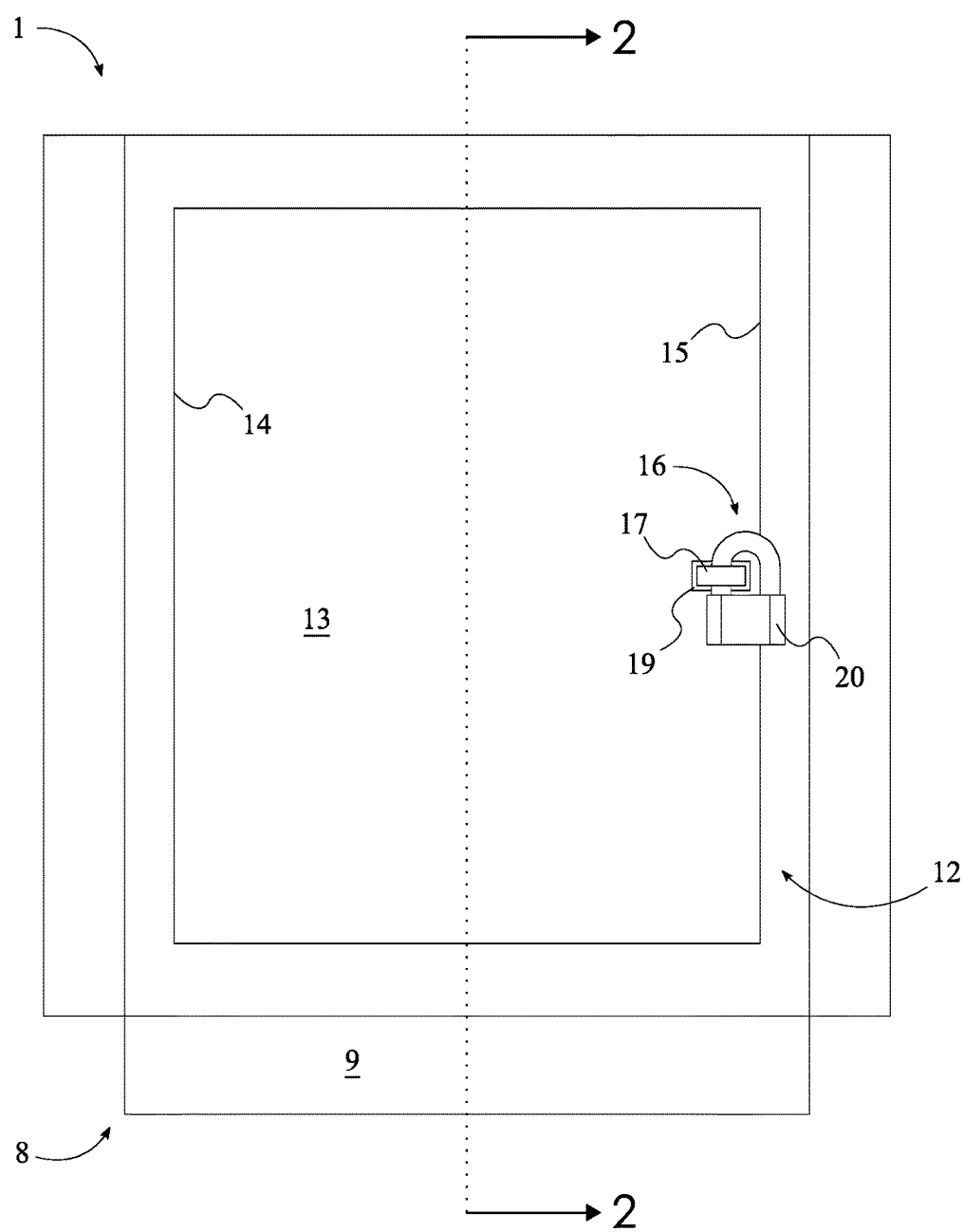
FIG. 1 is a front view of the present invention.

Access to the contents of the receptacle 1 must be restricted to only the user of the present invention. To this end, the lockable hatch 12 comprises a door 13 and a locking mechanism 16. The door 13 is a rigid surface that protects the contents of the receptacle 1. The locking mechanism 16 secures the door 13 in the closed position relative to the receptacle 1, as seen in FIG. 1. The door 13 comprises a first edge 14 and a second edge 15. The first edge 14 is a segment of the door 13 that enables positioning of the door 13 relative to the receptacle 1. The second edge 15 is a segment of the door 13 that enables positioning of the locking mechanism 16 relative to the door 13 and the receptacle 1. The door 13 is coextensive with the access opening 11. This arrangement ensures that the door 13 fully seals the receptacle 1 when the door 13 is in the closed orientation. The first edge 14 and the second edge 15 are positioned opposite each other across the door 13. This arrangement ensures that the locking mechanism 16 is positioned correctly relative to the first edge 14. Thus, the first edge 14 is hingedly connected to the receptacle 1. In this way, the door 13 is capable of swinging about the first edge 14. The locking mechanism 16 is operatively integrated in between the second edge 15 and the receptacle 1, wherein the locking mechanism 16 is used to selectively secure the door 13 in a closed position. This arrangement prevents the hinging motion of the door 13 when the locking mechanism 16 is in a locked configuration and allows operation of the door 13 when the locking mechanism 16 is in an unlocked configuration.

Figure 5:
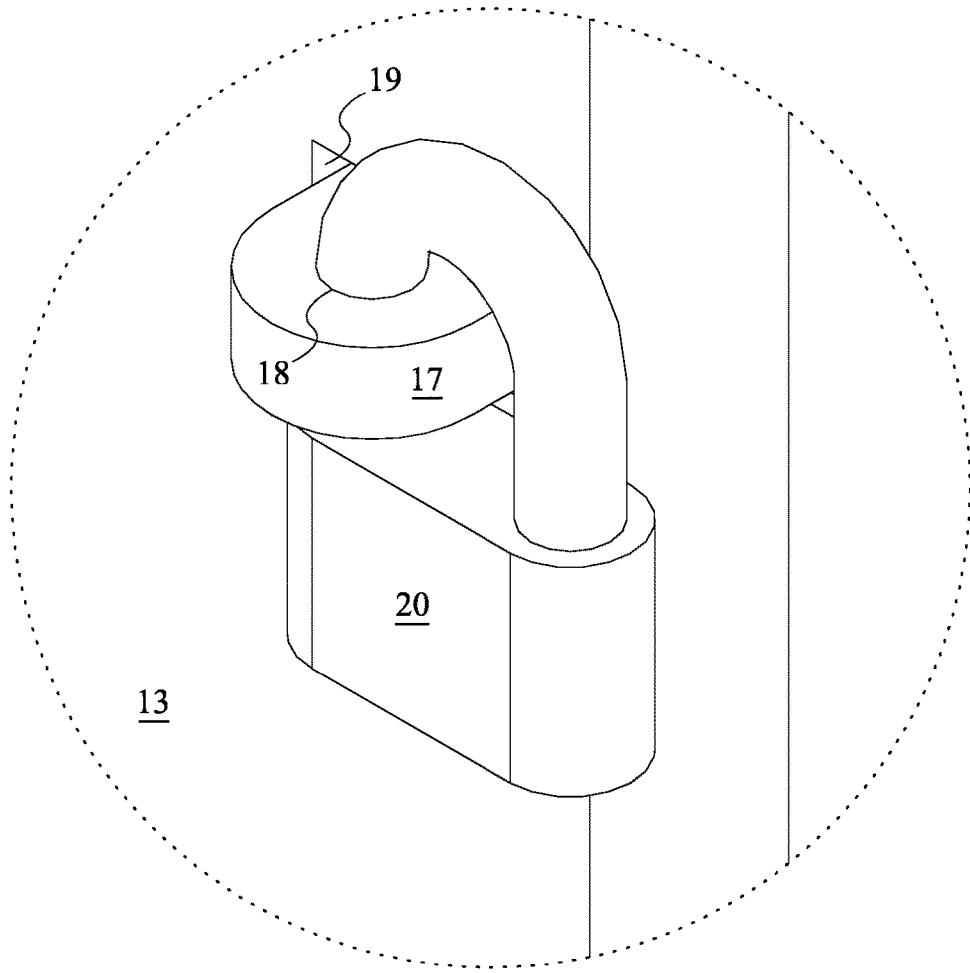
FIG. 5 is a detail view of the present invention taken about circle 5 in FIG. 4.

The locking mechanism 16 must be equipped to prevent the door 13 from opening or closing. To this end, the locking mechanism 16 comprises a tab 17, a lock engagement hole 18, a slot 19, and a portable lock 20, as seen in FIG. 5. The tab 17 is a rigid segment extending from the receptacle 1. The lock engagement hole 18 is a cut traversing through the tab 17 that allows for addition of many types of lock. The slot 19 is a cut through the door 13 that enables the tab 17 to pass through the door 13. The portable lock 20 is a connector, such as a padlock, keylock, or other such connector that allows selective access to the inside of the receptacle 1. The slot 19 traverses through the door 13. This allows for positioning of the lock engagement hole 18. The tab 17 is laterally connected to the receptacle 1. This enables the tab 17 to be utilized in conjunction with the locking mechanism 16. The tab 17 is further positioned through the slot 19. This arrangement allows the tab 17 to move into and out of the slot 19. The lock engagement hole 18 traverses through the tab 17. In this way, the lock engagement hole 18 is in position for use in conjunction with the portable lock 20. The portable lock 20 is engaged through the lock engagement hole 18. In this arrangement, the portable lock 20 engaged with the lock engagement hole 18 prevents the door 13 from swinging open.

The one-way access hinge mechanism 5 is in place to swing open for the input of items into the rim 2, while simultaneously preventing the release of such items through the rim 2. To this end, the one-way access hinge mechanism 5 comprises a spring 6 and a rotational stop 7, as seen in FIG. 2. The spring 6 is a curved extrusion capable of elastically storing potential energy and releasing mechanical energy. The spring 6 may be positioned within the hinge of the tongue plate 4, as a spring hinge, or may be any of a variety of other appropriately-aligned spring mechanisms. The rotational stop 7 is a rigid protrusion that prevents the tongue plate 4 from swinging past the rim 2. The spring 6 is operatively integrated in between the receptacle 1 and the tongue plate 4, wherein the spring 6 is used to retractably rotate the tongue towards the rim 2. This arrangement allows the spring 6 to apply force that presses the tongue plate 4 back into position relative to the rim 2. The rotational stop 7 is operatively integrated in between the receptacle 1 and the tongue plate 4, wherein the rotational stop 7 is used to prevent rotation of the tongue plate 4 past the rim 2. This arrangement prevents the tongue plate 4 from traveling beyond the rim 2 due to the forces exerted from the spring 6. In an exemplary embodiment, the tongue plate 4 is coextensive with the rim 2. This allows the tongue plate 4 to cover the entire rim 2, preventing hands from reaching into the receptacle 1 to access contained items.

Figure 6:
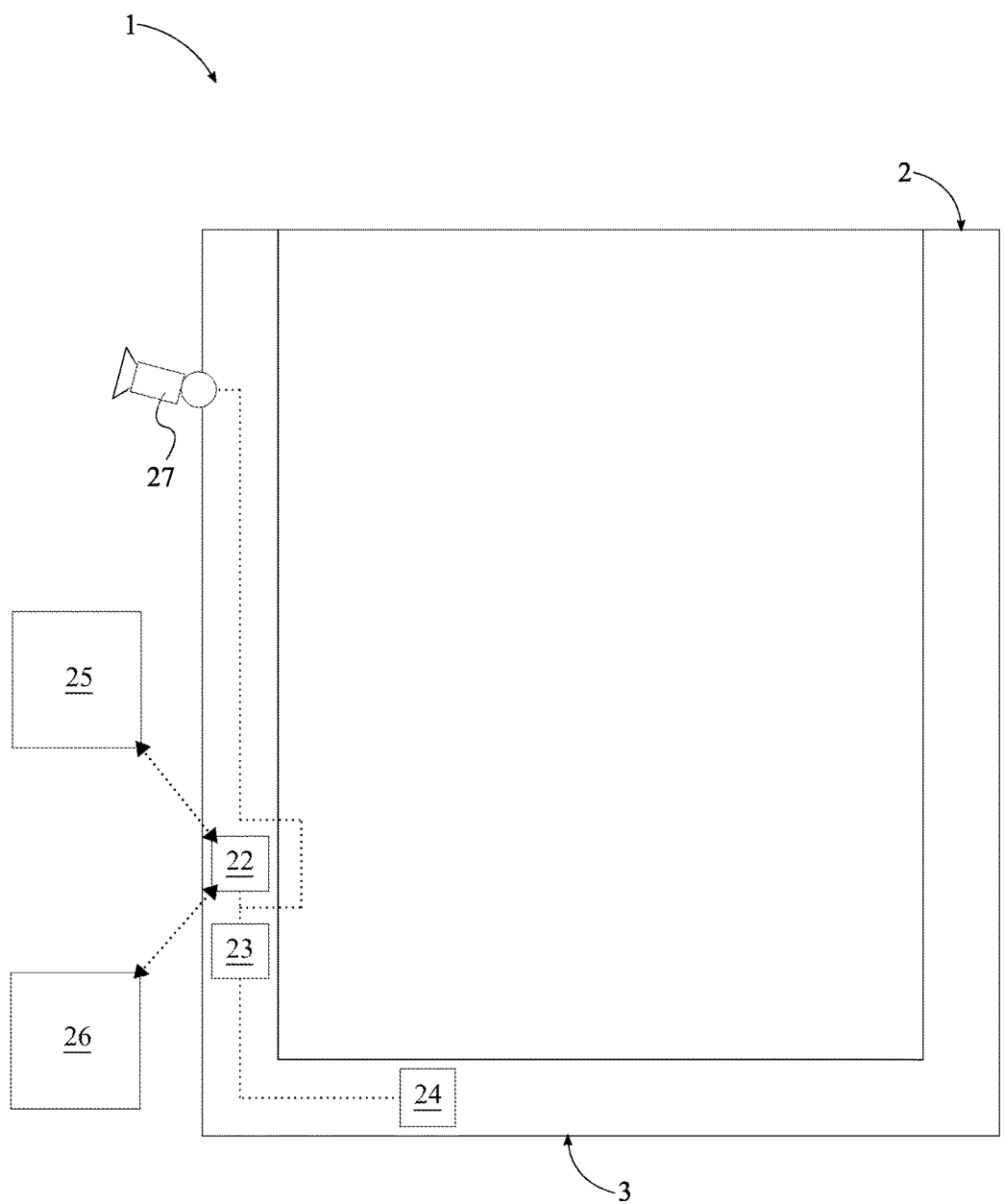
FIG. 6 is a schematic diagram illustrating electrical and wireless connections for the present invention.

In an exemplary embodiment, the present invention must be equipped to send and receive signals between the package recipient and the delivery company. To this end, the present invention comprises a wireless transceiver 22, a microcontroller 23, a package-detecting sensor 24, and a package-recipient computing device 25, as seen in FIG. 6. The wireless transceiver 22 allows for communication between the present invention and the delivery service. The microcontroller 23 is a device capable of converting signal inputs into electrical outputs for subsequent usage. The package-detecting sensor 24 is a pressure, weight, infrared, or other such sensor capable of recognizing the presence of a package and subsequently relaying that information in the form of electrical impulses to the microcontroller 23. The package-recipient computing device 25 is a remote device such as a smartphone or a wireless remote capable of communicating with the wireless transceiver 22. In an exemplary embodiment, the package-recipient computing device 25 relates to a wireless device equipped with a mobile software application that can interact with the wireless transceiver 22. The package-detecting sensor 24 is mounted within the receptacle 1. This ensures that the package-detecting sensor 24 is in position to detect packages within the receptacle 1. The microcontroller 23 and the wireless transceiver 22 are integrated into the receptacle 1. This arrangement allows for physical proximity of the microcontroller 23 and the wireless transceiver 22, as well as physical proximity of the microcontroller 23 to the package-detecting sensor 24, thus facilitating connection of these components. The package-detecting sensor 24 is electronically connected to the microcontroller 23. In this way, signals from the package-detecting sensor 24 are directly relayed to the microcontroller 23. The microcontroller 23 is communicably coupled to the package-recipient computing device 25 by the wireless transceiver 22. This arrangement enables information gathered by the package-detecting sensor 24, namely, the presence or absence of a package or item inside the receptacle 1, to be sent through the microcontroller 23 to the package-recipient computing device 25 through the wireless transceiver 22.

In a similar arrangement, the electrical components of the present invention can be arranged to toggle the open/closed status of the locking mechanism 16. In this embodiment, the present invention further comprises a package-sender computing device 26, as described above and seen in FIG. 6. The microcontroller 23 and the wireless transceiver 22 are integrated into the receptacle 1. This arrangement allows for physical proximity of the microcontroller 23 and the wireless transceiver 22, thus facilitating connection of these components. The locking mechanism 16 of the lockable hatch 12 is electronically connected to the microcontroller 23. In this way, an appropriate signal from the microcontroller 23 can engage or disengage the locking mechanism 16 in order to respectively close or open the lockable hatch 12. The microcontroller 23 is communicably coupled to the package-recipient computing device 25 by the wireless transceiver 22. This arrangement enables information gathered by the package-detecting sensor 24, namely, the presence or absence of a package or item inside the receptacle 1, to be sent through the microcontroller 23 to the package-recipient computing device 25 through the wireless transceiver 22. The microcontroller 23 is communicably coupled to the package-sender computing device 26 by the wireless transceiver 22. In this way, the package delivery company has control over the locked or unlocked status of the locking mechanism 16.

In another similar arrangement, the electrical components of the present invention can be arranged to respond to the presence or absence of unauthorized parties as an added security feature. To this end, the present invention comprises a video camera 27. The video camera 27 is an image-capturing device that can record and store images of events within its visual range, as described above and seen in FIG. 6. The video camera 27 is pivotably mounted to the receptacle 1. This arrangement enables the video camera 27 to redirect its visual scope, either periodically or due to responses from internal sensors. The microcontroller 23 and the wireless transceiver 22 are integrated into the receptacle 1. This arrangement allows for physical proximity of the microcontroller 23 and the wireless transceiver 22, thus facilitating connection of these components. The video camera 27 is electronically connected to the microcontroller 23. In this way, signals and images captured by the video camera 27 are subsequently sent to the microcontroller 23. The microcontroller 23 is communicably coupled to the package-recipient computing device 25 by the wireless transceiver 22. Further, the microcontroller 23 is communicably coupled to the package-sender computing device 26 by the wireless transceiver 22. This arrangement allows for the images captured by the video camera 27 to be sent to the package-sender computing device 26 and the package-recipient computing device 25, thus allowing both parties to interact with the captured visual data.

Although the invention has been explained in relation to its preferred embodiment, it is to be understood that many other possible modifications and variations can be made without departing from the spirit and scope of the invention as hereinafter claimed.

What is claimed is:

1. A package receptacle comprising:
   a receptacle;
   a tongue plate;
   a one-way access hinge mechanism;
   a slab;
   an access opening;
   a lockable hatch;
   the receptacle comprising a rim and a base;
   the tongue plate being connected adjacent to the rim by the one-way access hinge mechanism;
   the tongue plate being oriented towards a central axis of the receptacle;
   the slab being externally connected to the receptacle, adjacent to the base;
   the access opening laterally traversing into the receptacle;
   the access opening being positioned in between the tongue plate and the base;
   the lockable hatch being hingedly connected to the receptacle, adjacent to the access opening;
   the one-way access hinge mechanism comprising a spring and a rotational stop;
   the spring being operatively integrated in between the receptacle and the tongue plate, wherein the spring is used to retractably rotate the tongue towards the rim; and
   the rotational stop being operatively integrated in between the receptacle and the tongue plate, wherein the rotational stop is used to prevent rotation of the tongue plate past the rim.

2. The package receptacle as claimed in claim 1 comprising:
   the slab comprising a slab body and a plurality of mounting holes;
   the plurality of mounting holes traversing into the slab body;
   the plurality of mounting holes being distributed across the slab body; and
   the plurality of mounting holes positioned adjacent to the base.

3. The package receptacle as claimed in claim 2 comprising:
   the plurality of mounting holes being positioned parallel to the central axis of the receptacle.

4. The package receptacle as claimed in claim 2 comprising:
   a plurality of fasteners;
   the plurality of fasteners being mounted through the base; and
   each of the plurality of fasteners being threadably engaged to a corresponding hole from the plurality of mounting holes.

5. The package receptacle as claimed in claim 1 comprising:
the lockable hatch comprising a door and a locking mechanism;
the door comprising a first edge and a second edge;
the door being coextensive with the access opening;
the first edge and the second edge being positioned opposite each other across the door;
the first edge being hingedly connected to the receptacle; and
the locking mechanism being operatively integrated in between the second edge and the receptacle, wherein the locking mechanism is used to selectively secure the door in a closed position.

6. The package receptacle as claimed in claim 5 comprising:
the locking mechanism comprising a tab, a lock engagement hole, a slot, and a portable lock;
the slot traversing through the door;
the tab being laterally connected to the receptacle;
the tab being positioned through the slot;
the lock engagement hole traversing through the tab; and
the portable lock being engaged through the lock engagement hole.

7. The package receptacle as claimed in claim 1 comprising:
the tongue plate being coextensive with the rim.

8. The package receptacle as claimed in claim 1 comprising:
a wireless transceiver;
a microcontroller;
a package-detecting sensor;
a package-recipient computing device;
the package-detecting sensor being mounted within the receptacle;
the microcontroller and the wireless transceiver being integrated into the receptacle;
the package-detecting sensor being electronically connected to the microcontroller; and
the microcontroller being communicably coupled to the package-recipient computing device by the wireless transceiver.

9. The package receptacle as claimed in claim 1 comprising:
a wireless transceiver;
a microcontroller;
a package-recipient computing device;
a package-sender computing device;
the microcontroller and the wireless transceiver being integrated into the receptacle;
a locking mechanism of the lockable hatch being electronically connected to the microcontroller;
the microcontroller being communicably coupled to the package-recipient computing device by the wireless transceiver; and
the microcontroller being communicably coupled to the package-sender computing device by the wireless transceiver.

10. The package receptacle as claimed in claim 1 comprising:
a video camera;
a wireless transceiver;
a microcontroller;
a package-recipient computing device;
a package-sender computing device;
the video camera being pivotably mounted to the receptacle;
the microcontroller and the wireless transceiver being integrated into the receptacle;
the video camera being electronically connected to the microcontroller;
the microcontroller being communicably coupled to the package-recipient computing device by the wireless transceiver; and
the microcontroller being communicably coupled to the package-sender computing device by the wireless transceiver.

11. A package receptacle comprising:
a receptacle;
a tongue plate;
a one-way access hinge mechanism;
a slab;
an access opening;
a lockable hatch;
the receptacle comprising a rim and a base;
the one-way access hinge mechanism comprising a spring and a rotational stop;
the slab comprising a slab body and a plurality of mounting holes;
the tongue plate being connected adjacent to the rim by the one-way access hinge mechanism;
the tongue plate being oriented towards a central axis of the receptacle;
the slab being externally connected to the receptacle, adjacent to the base;
the access opening laterally traversing into the receptacle;
the access opening being positioned in between the tongue plate and the base;
the lockable hatch being hingedly connected to the receptacle, adjacent to the access opening;
the spring being operatively integrated in between the receptacle and the tongue plate, wherein the spring is used to retractably rotate the tongue towards the rim;
the stop being operatively integrated in between the receptacle and the tongue plate, wherein the stop is used to prevent rotation of the tongue plate past the rim;
the plurality of mounting holes traversing into the slab body;
the plurality of mounting holes being distributed across the slab body; and
the plurality of mounting holes positioned adjacent to the base.

12. The package receptacle as claimed in claim 11 comprising:
the plurality of mounting holes being positioned parallel to the central axis of the receptacle.

13. The package receptacle as claimed in claim 11 comprising:
a plurality of fasteners;
the plurality of fasteners being mounted through the base; and
each of the plurality of fasteners being threadably engaged to a corresponding hole from the plurality of mounting holes.

14. The package receptacle as claimed in claim 11 comprising:
the lockable hatch comprising a door and a locking mechanism;
the door comprising a first edge and a second edge;
the door being coextensive with the access opening;
the first edge and the second edge being positioned opposite each other across the door;
the first edge being hingedly connected to the receptacle; and the locking mechanism being operatively integrated in between the second edge and the receptacle, wherein the locking mechanism is used to selectively secure the door in a closed position.

15. The package receptacle as claimed in claim 14 comprising:
    the locking mechanism comprising a tab, a lock engagement hole, a slot, and a portable lock;
    the slot traversing through the door;
    the tab being laterally connected to the receptacle;
    the tab being positioned through the slot;
    the lock engagement hole traversing through the tab; and
    the portable lock being engaged through the lock engagement hole.

16. The package receptacle as claimed in claim 11 comprising:
    the tongue plate being coextensive with the rim.

17. The package receptacle as claimed in claim 11 comprising:
    a wireless transceiver;
    a microcontroller;
    a package-detecting sensor;
    a package-recipient computing device;
    the package-detecting sensor being mounted within the receptacle;
    the microcontroller and the wireless transceiver being integrated into the receptacle;
    the package-detecting sensor being electronically connected to the microcontroller; and
    the microcontroller being communicably coupled to the package-recipient computing device by the wireless transceiver.

18. The package receptacle as claimed in claim 11 comprises comprising:
    a wireless transceiver;
    a microcontroller;
    a package-recipient computing device;
    a package-sender computing device;
    the microcontroller and the wireless transceiver being integrated into the receptacle;
    a locking mechanism of the lockable hatch being electronically connected to the microcontroller;
    the microcontroller being communicably coupled to the package-recipient computing device by the wireless transceiver; and
    the microcontroller being communicably coupled to the package-sender computing device by the wireless transceiver.

19. The package receptacle as claimed in claim 11 comprising:
    a video camera;
    a wireless transceiver;
    a microcontroller;
    a package-recipient computing device;
    a package-sender computing device;
    the video camera being pivotably mounted to the receptacle;
    the microcontroller and the wireless transceiver being integrated into the receptacle;
    the video camera being electronically connected to the microcontroller;
    the microcontroller being communicably coupled to the package-recipient computing device by the wireless transceiver; and
    the microcontroller being communicably coupled to the package-sender computing device by the wireless transceiver.

\* \* \* \* \*